United States Patent
Madsen

(10) Patent No.: US 10,479,030 B2
(45) Date of Patent: Nov. 19, 2019

(54) METHOD FOR APPLYING FIBRE MATERIAL ON A VERTICAL SURFACE OF A WEB OF A WIND TURBINE BLADE

(71) Applicant: Siemens Gamesa Renewable Energy A/S, Brande (DE)

(72) Inventor: Kristian Lehmann Madsen, Fredericia (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 1107 days.

(21) Appl. No.: 14/485,885

(22) Filed: Sep. 15, 2014

(65) Prior Publication Data

US 2015/0075713 A1 Mar. 19, 2015

(30) Foreign Application Priority Data

Sep. 19, 2013 (EP) .................................. 13185157

(51) Int. Cl.
| | |
|---|---|
| *B29C 70/30* | (2006.01) |
| *B29C 70/54* | (2006.01) |
| *B29C 70/38* | (2006.01) |
| *B29C 70/44* | (2006.01) |
| *B29K 105/08* | (2006.01) |
| *B29K 105/00* | (2006.01) |
| *B29L 31/08* | (2006.01) |

(52) U.S. Cl.
CPC .............. *B29C 70/30* (2013.01); *B29C 70/38* (2013.01); *B29C 70/443* (2013.01); *B29C 70/541* (2013.01); *B29K 2105/0058* (2013.01); *B29K 2105/0809* (2013.01); *B29L 2031/085* (2013.01); *Y02P 70/523* (2015.11); *Y10T 156/10* (2015.01)

(58) Field of Classification Search
CPC combination set(s) only.
See application file for complete search history.

(56) References Cited

U.S. PATENT DOCUMENTS

| | | | | |
|---|---|---|---|---|
| 3,115,271 | A * | 12/1963 | Anderson | B29C 53/585 156/189 |
| 3,616,070 | A * | 10/1971 | Lemelson | B29C 53/70 156/167 |
| 5,043,033 | A * | 8/1991 | Fyfe | B29C 70/56 156/161 |
| 6,146,576 | A * | 11/2000 | Blackmore | B29C 66/496 156/273.9 |

(Continued)

FOREIGN PATENT DOCUMENTS

| | | | | |
|---|---|---|---|---|
| DE | 102010015199 A | | 10/2011 | |
| EP | 1310351 A1 * | | 5/2003 | B29C 70/443 |

(Continued)

*Primary Examiner* — Jeffry H Aftergut
*Assistant Examiner* — Jaeyun Lee
(74) *Attorney, Agent, or Firm* — Beusse Wolter Sanks & Maire

(57) ABSTRACT

A method for applying fibre material on a vertical surface is provided. The method has the following steps: spraying an adhesive on the vertical surface; applying the fibre material on the sprayed surface; spraying additional adhesive on the fibre material for another layer of fibre material; applying another layer of fibre material on the sprayed fibre material; and injecting the layers of fibre material with a resin.

13 Claims, 4 Drawing Sheets

(56) References Cited

U.S. PATENT DOCUMENTS

2002/0117252 A1* 8/2002 Baldwin ................. B29B 11/16
                                                         156/178
2013/0174969 A1    7/2013 Kehrle

FOREIGN PATENT DOCUMENTS

| GB | 1356863 A | * | 6/1974  | ............. B29C 53/70 |
| GB | 2410458 A |   | 8/2005  |                          |
| JP | 09300476 A | * | 11/1997 | ............. B29C 70/30 |
| WO | 9426505 A1 |   | 11/1994 |                          |

* cited by examiner

METHOD FOR APPLYING FIBRE MATERIAL ON A VERTICAL SURFACE OF A WEB OF A WIND TURBINE BLADE

CROSS REFERENCE TO RELATED APPLICATIONS

This application claims priority to and the benefit of European Application No. EP13185157 filed Sep. 19, 2013, incorporated by reference herein in its entirety.

FIELD OF INVENTION

The present invention relates to a method for applying fibre material on a vertical surface of a web of a wind turbine blade.

BACKGROUND OF INVENTION

Rotor blades for wind turbines are made by laying a fibre material on a mould surface resembling a negative image of the fibre reinforced structure to be produced and in which a resin is infused and cured after the fibre material is laid on the mould surface. The form of such a blade is that is has a suction side and a pressure side with a shape determined by aerodynamical requirements. In a typical blade construction both sides are held in relation to each other by a beam, a spar or a web. Normally the web is casted or produced as a separate piece and afterwards being established together with other laid parts such as by using adhesives. As an alternative it is known that the web can be an integral part of a moulded structure and casted together with e.g. one or both of the sides of the blade. Basically the web is a structure which extends substantially perpendicular to the sides of the blades, therefore it is a challenge to build these parts together in a mould.

It is a known method to layout and build the web on a location remote to the blade moulds and subsequently lift and place the web in position in the mould so as to form the structure for being casted. This conventional method is shown in FIGS. 1 to 3.

FIG. 1 shows a blade mould 1 in which a glass fibre material 2 is laid out as a first side. FIG. 2 shows a vertical web construction 3 on which glass fibre material 4 is applied at a position remote from the blade mould 1. After building the vertical web construction 3 with said glass fibre material 4 the web construction 3 is lifted and positioned on the glass fibre material 2 in the blade mould 1 as is shown in FIG. 3.

FIG. 4 is a perspective view of the vertical web construction 3 of FIG. 2 whereby the vertical web construction 3 is made from wood and a plurality of glass fibre mats 5 is applied and laid on the vertical surface.

However, this conventional method is time consuming and requires much production facility space, as space is required for both the blade moulds and for the construction of the web.

SUMMARY OF INVENTION

It is therefore an object of the present invention to provide an easier method for applying a fibre material on a vertical surface.

According to the present invention this object is achieved in the above defined method by the following steps: spraying an adhesive on the vertical surface, applying the fibre material on the sprayed surface, spraying additional adhesive on the fibre material for another layer of fibre material, applying another layer of fibre material on the sprayed fibre material, and injecting the layers of fibre material with a resin.

The invention is based on the idea that a fibre material can be applied on a vertical surface, whereby less production facility space is required by adhering said fibre material to the surface during layout. According to the invention a beam or web can be produced directly in the mould during layout. It is advantageous that the web can be constructed while being positioned in a blade mould. Hereby it is not necessary to lift the web construction from a remote position into the mould. Accordingly this is both time and cost effective.

Another advantage of the invention is that it enables the layout of a fibre material on substantially vertical and highly angled surfaces.

According to a further development of the invention the fibre material is unrolled from a reel. Accordingly the fibre material is unrolled from said reel and directly attached to the vertical surface and held in place by the adhesive.

In the inventive method a glass fibre material and/or a carbon fibre material and/or a synthetic fibre material is preferred as fibre material. The actual layout depends on the design of a wind turbine blade. Normally it consists of several fibre material layers which are applied in different directions, namely with different fibre angles. It is possible that one wind turbine blade consists e.g. of a mixture of glass fibre material and carbon fibre material and/or at least one synthetic fibre material.

It is particularly preferred that a fibre material in the form of a mat or a fabric is used. The use of a mat or a fabric enables to cover the surface of a vertical web construction very quickly. Subsequently an adhesive is applied on the fibre material, so that another layer of fibre material can be laid up.

According to a further development of the invention a vertical surface is used which is made of wood or foam. An adhesive is sprayed on said vertical surface, subsequently the fibre material is applied on the sprayed surface.

In the inventive method it is preferred that said fibre material is applied on both sides of the vertical surface. Accordingly a symmetric laminate or an unsymmetric laminate can be produced, as is required by design constraints.

According to the inventive method the resin can be injected in a vacuum assisted resin transfer molding (VARTM) process. According to this method the vertical web construction and/or the mould surface which are covered with a dry fibre material is covered by a thin film, subsequently air is sucked out between the thin film and the mould surface and the vertical web construction, respectively, and a liquid resin is injected in order to embed the fibre material into resin.

The inventive method can be performed very economically in that the step of spraying an adhesive and/or the step of applying a fibre material is performed by an automatic actuator or a robot, in particular an industrial robot. Accordingly the layup of fibre material can be performed automatically under the control of a controller.

According to a further development of the inventive method said actuator or said robot comprises a means for exerting pressure to applied fibre material. As the fibre material which is unrolled from a reel is pressed to the vertical web construction, the fibre material is held in place after being positioned, so that no wrinkles can occur. Unrolling said fibre material from a reel is simply effected by moving said reel, when the positioned fibre material is pressed onto the vertical web construction and its adhesive by said pressure means.

The invention and its underlying principle will be better understood when consideration is given to the following detailed description of preferred embodiments.

DETAILED DESCRIPTION OF INVENTION

The method for applying fibre material is explained with regard to FIG. 5 to FIG. 12.

Figure 1:
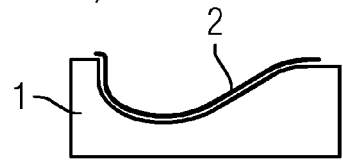
FIG. 1-4 show a conventional method for applying fibre material.
Figure 2:
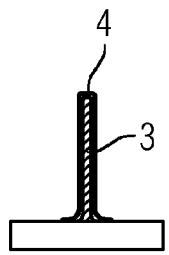
Figure 3:
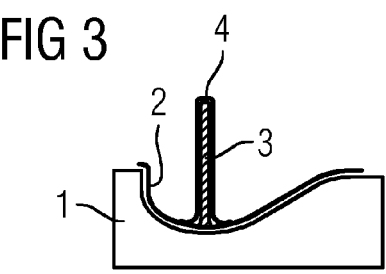
Figure 4:
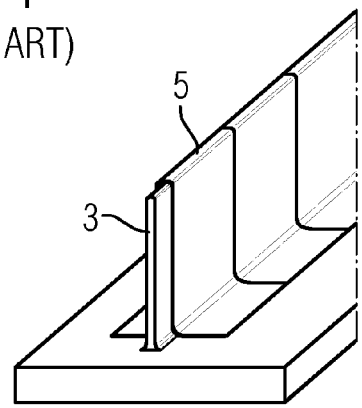
Figure 5:
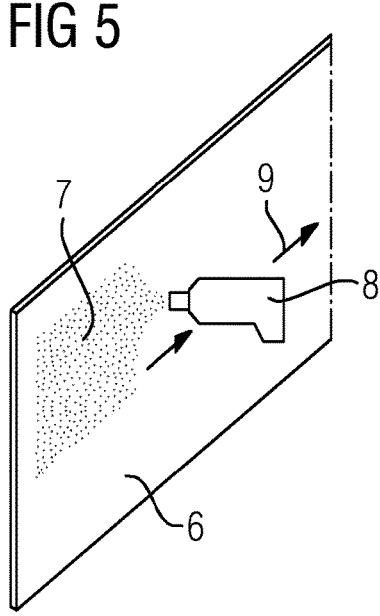
FIG. 5 shows the step of spraying an adhesive of the inventive method.

FIG. 5 shows a vertical surface, namely a vertical web construction 6 made from wood on which it is desired to build up a fibre structure which in turn is to be moulded to a composite fibre component. In this embodiment the fibre material is glass fibre. However, other embodiments are possible, where carbon fibre or a mixture of glass fibre and carbon fibre is used.

In a first step of the method for applying fibre material a thin layer of an adhesive 7 is sprayed on the vertical web construction 6 by a spray gun 8 which is moved along the surface of the vertical web construction 6 as is indicated by arrows 9. Spraying the adhesive can be done manually or automatically, e.g. by a robot.

It is preferred that the vertical web construction is positioned above a mould for a wind turbine blade, accordingly the vertical web construction 6 is directly established at a position where it is needed for building up a fibre structure.

Figure 6:
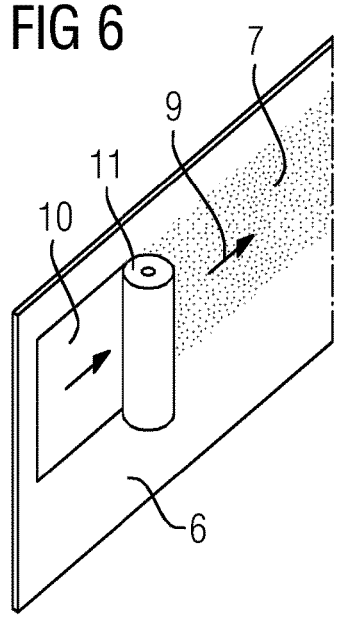
FIG. 6 shows the step of applying the fibre material of the inventive method.

After spraying the adhesive on the vertical web construction 6, whereby the adhesive is not yet cured, a glass fibre mat 10 is established on the sprayed area as is schematically illustrated in FIG. 6. The glass fibre mat 10 is rolled off from a reel 11 and directly attached to the sticky vertical surface of the web construction 6 and held in place.

Figure 7:
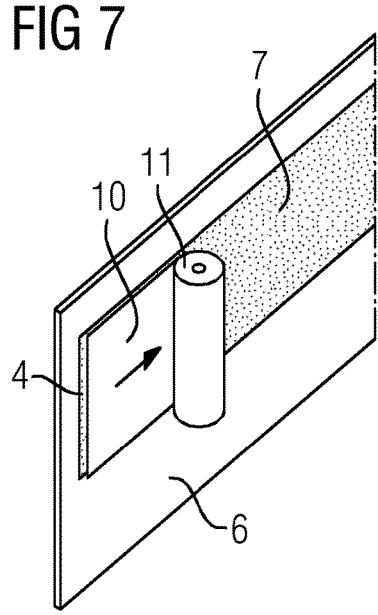
FIG. 7 shows the step of applying multiple layers of fibre material of the inventive method.

In FIG. 7 it is shown that multiple layers of glass fibre mats 10 can be laid out on top of each other, whereby each glass fibre mat 10, which is attached to the vertical web construction 6, is covered with a thin layer of adhesive 7. Each single layer of glass fibre can be attached in a different, specific angle, as is determined during design of a wind turbine blade. An additional adhesive layer 7 is to be sprayed on for every new layer of fibre material which is to be attached for holding this layer.

It is possible to use an adhesive for fixing the layers of glass fibre which is of a chemical composition which is desolved by resin injected in a vacuum assisted resin transfer molding (VARTM) process.

According to a modification of the method a fibre material particular a glass fibre material in the form of mats is used which are established on the thin adhesive layer one by one. Attaching the single mats can be done manually or automatically by a robot.

Figure 8:
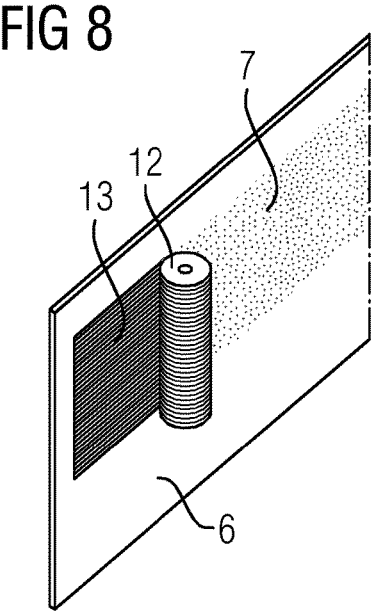
FIG. 8 shows the step of applying fibre material in form of rovings of the inventive method.

FIG. 8 shows another embodiment of the method, whereby a glass fibre material in form of rovings is used. These rovings are provided on a reel 12 on which rovings 13 have been wound up.

Figure 9:
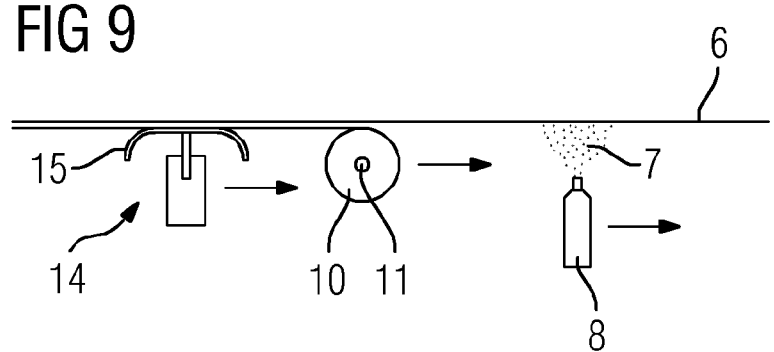
FIG. 9 shows how fibre material is pressed onto the adhesive by a pressure means.

FIG. 9 shows another embodiment of the method for applying fibre material on a vertical surface, whereby a fibre material is pressed on the vertical surface by a pressure means.

Firstly a thin layer of adhesive 7 is applied on a vertical web construction 6 by a spray gun 8. A glass fibre mat 10 is provided on a reel 11 from which it is unrolled onto the sticky surface of the vertical web construction 6. A pressure means 14 is used for pressing the unrolled glass fibre mat 10 onto the vertical surface. In FIG. 9 the pressure means 14 is only shown schematically. It comprises a plate 15 which is spring-loaded so that said pressure means 14 can follow the contour of the vertical surface even if the surface is curved.

Figure 10:
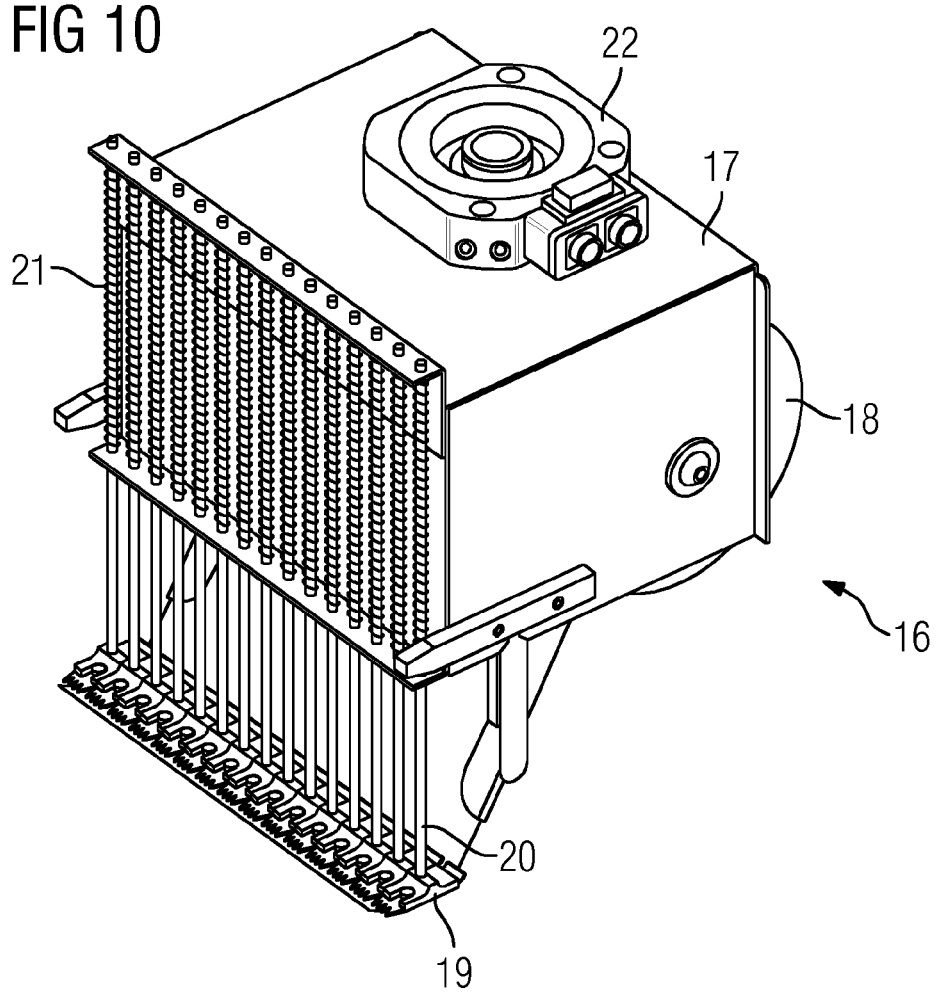
FIG. 10-12 show various views of a pressure means.
Figure 11:
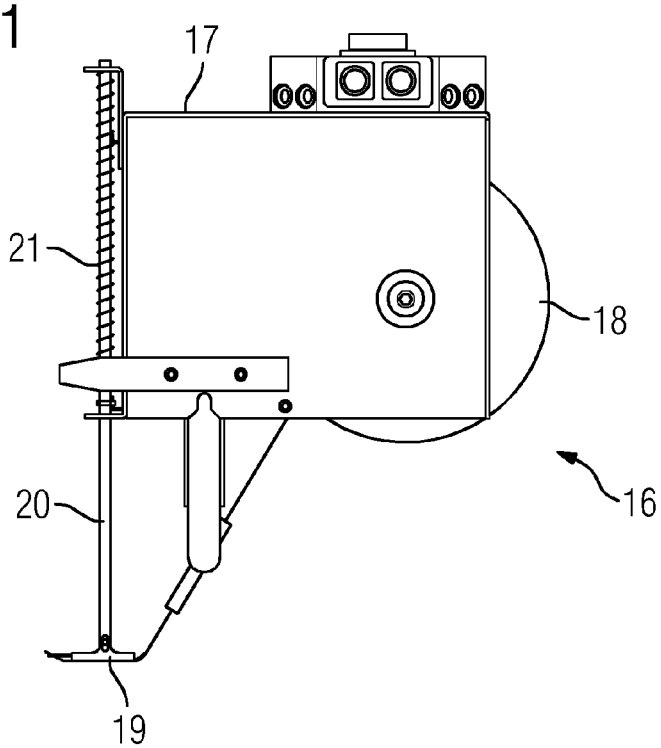
Figure 12:
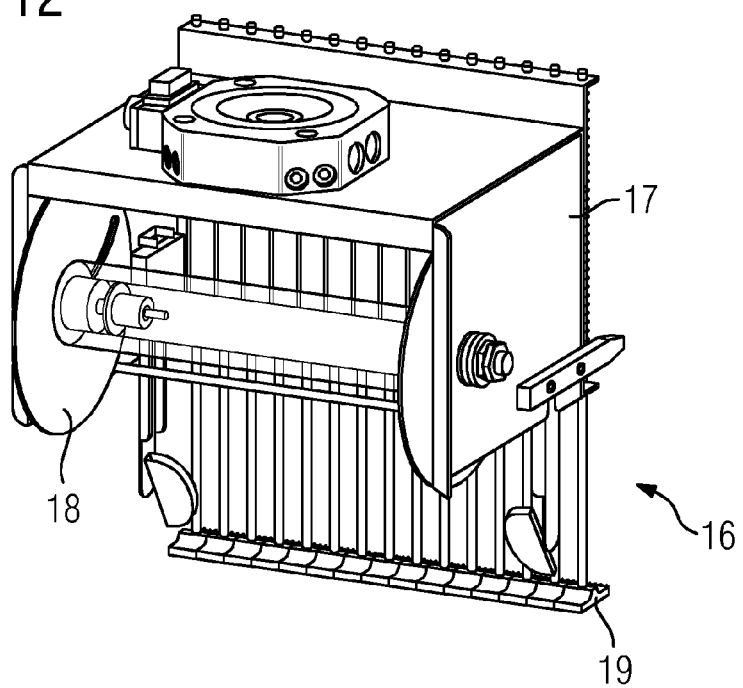

FIG. 10 is a perspective view of a pressure means 16, FIG. 11 is a side view of the pressure means 16 and FIG. 12 is another perspective view of the pressure means 16.

Pressure means 16 is explained with regard to FIGS. 10, 11 and 12. It comprises a housing 17 accommodating a reel 18, on which a fibre material, in particular a glass fibre mat is wound.

The pressure means 16 comprises a number of separate plates 19, which are arranged in a row. Each plate 19 is connected to a rod 20 which is loaded by a spring 21. In FIG. 11 one can see that when a fibre mat or a roving is unreeled from a reel 18 it is pressed onto a surface by said plate 19. As the plate 19 is spring-loaded it can even follow a curved surface. The pressure means 16 can be used for fibre mats as well as for rovings which are wound in parallel on a reel.

On one side of the pressure means 16 a connector 22 for an industrial robot is provided so that the pressure means 16 can be moved along a vertical web construction or along a mould by an industrial robot.

Although the present invention has been described in detail with reference to the preferred embodiment, the present invention is not limited by the disclosed examples from which the skilled person is able to derive other variations without departing from the scope of the invention.

The invention claimed is:

1. A method for applying fibre material on a vertical surface to form a web of a wind turbine blade, the method comprising:
    positioning a vertical surface in a mould for a wind turbine blade at a position corresponding to a position of a web of the blade;
    spraying an adhesive on the vertical surface;
    applying fibre material on the sprayed surface directly in the mould during layout of fibre material in the mould;
    spraying additional adhesive on the fibre material for another layer of fibre material;
    applying another layer of fibre material on the sprayed fibre material; and
    injecting the fibre material on the vertical surface and in the mould with a resin during a resin injection process for the mould.

2. The method according to claim 1, wherein the fibre material is unrolled from a reel.

3. The method according to claim 1, wherein a glass fibre material and/or a carbon fibre material and or a synthetic fibre material is used as the fibre material.

4. The method according to claim 1, wherein a fibre material in the form of a mat or a fabric is used.

5. The method according to claim 1, wherein a vertical surface is used which is made of wood or foam.

6. The method according to claim 1, wherein fibre material is applied on both sides of the vertical surface.

7. The method according to claim 1, wherein the resin is injected in a vacuum assisted resin transfer molding (VARTM) process.

8. The method according to claim 1, wherein the step of spraying an adhesive and/or the step of applying a fibre material is performed by an automatic actuator or an industrial robot.

9. The method according to claim 8, wherein an actuator or a robot is used comprising a means for exerting pressure to an applied fibre material.

10. The method according to claim 1, further comprising selecting the adhesive to be of a composition which is desolved by the injected resin.

11. A method for applying fibre material on a vertical surface to form a web of a wind turbine blade, the method comprising:

positioning a vertical surface in a mould for a wind turbine blade at a position corresponding to a position of a web of the blade;

spraying an adhesive on the vertical surface;

applying fibre material on the sprayed surface directly in the mould during layout of fibre material in the mould; and injecting the fibre material on the vertical surface and in the mould with a resin during a resin injection process.

12. The method of claim 11, further comprising:

applying the fibre material on the sprayed surface using an apparatus comprising a reel for supplying the fibre material and a plate for pressing the fibre material onto the sprayed surface.

13. The method according to claim 11, further comprising selecting the adhesive to be of a composition which is desolved by the injected resin.

\* \* \* \* \*